(12) United States Patent
Arora et al.

(10) Patent No.: US 10,143,207 B2
(45) Date of Patent: Dec. 4, 2018

(54) SHELF-STABLE FOOD PRODUCT

(71) Applicants: Akshay Arora, Golden Valley, MN (US); Jill Conley, Golden Valley, MN (US); Danielle Waite, Golden Valley, MN (US); Jeffrey F. Enz, Golden Valley, MN (US)

(72) Inventors: Akshay Arora, Golden Valley, MN (US); Jill Conley, Golden Valley, MN (US); Danielle Waite, Golden Valley, MN (US); Jeffrey F. Enz, Golden Valley, MN (US)

(73) Assignee: General Mills, Inc., Minneapolis, MN (US)

( * ) Notice: Subject to any disclaimer, the term of this patent is extended or adjusted under 35 U.S.C. 154(b) by 214 days.

(21) Appl. No.: 13/691,176

(22) Filed: Nov. 30, 2012

(65) Prior Publication Data

US 2014/0154362 A1 Jun. 5, 2014

(51) Int. Cl.
*A21D 13/38* (2017.01)
*A21D 13/24* (2017.01)
*A21D 13/13* (2017.01)

(52) U.S. Cl.
CPC ............ *A21D 13/38* (2017.01); *A21D 13/13* (2017.01); *A21D 13/24* (2017.01)

(58) Field of Classification Search
CPC ............ A21D 13/0009; A21D 13/0051; A21D 13/0041
USPC ........................................................ 426/93
See application file for complete search history.

(56) References Cited

U.S. PATENT DOCUMENTS

| 2,779,679 | A | * | 1/1957 | Kiers | 426/606 |
| 3,508,926 | A | * | 4/1970 | Rubenstein et al. | 426/297 |
| 4,330,566 | A | * | 5/1982 | Meyer et al. | 426/606 |
| 4,847,098 | A | | 7/1989 | Langler | |
| 5,023,099 | A | | 6/1991 | Boehm | |
| 5,529,800 | A | * | 6/1996 | Bourns | A23D 7/02 426/319 |
| 6,153,233 | A | | 11/2000 | Gordon et al. | |
| 8,486,469 | B2 | | 7/2013 | Coleman et al. | |
| 2004/0265472 | A1 | | 12/2004 | Corfman et al. | |
| 2011/0111111 | A1 | * | 5/2011 | Taylor | 426/560 |

(Continued)

FOREIGN PATENT DOCUMENTS

DE 19827083 3/2000

OTHER PUBLICATIONS

USDA Food Database. "Ice cream cones" Retrieved Sep. 24, 2014 http://ndb.nal.usda.gov/ndb/foods/show/5732.*

(Continued)

*Primary Examiner* — Katherine D Leblanc
(74) *Attorney, Agent, or Firm* — Diederiks & Whitelaw, PLC; Gregory P. Kaihoi, Esq.

(57) ABSTRACT

A shelf stable, confectionary food product having a core and a confectionary coating. The core is formed from dehydrated crumbs, such as dehydrated cake crumbs sweetened with sugar, and a shortening-based matrix comprising shortening and water. When the dehydrated crumbs are combined with the shortening-based matrix, the crumbs rehydrate. The food product has a shelf life at room temperature of more than one month, such as more than 3 months, or more than 6 months, or up to 9 months.

11 Claims, 2 Drawing Sheets

(56) References Cited

U.S. PATENT DOCUMENTS

2012/0222987 A1   9/2012   Cucci
2013/0101698 A1   4/2013   Coleman et al.

OTHER PUBLICATIONS

USDA Food Database "Corn Flake Crumbs" Retrieved Sep. 24, 2014 http://ndb.nal.usda.gov/ndb/foods/show/7898.*

Beuchat. "Water Activity of Some Foods and Susceptibility to Spoilage of Microorganisms" 1981 http://extension.psu.edu/food/preservation/issues/water-activity-of-foods/water-activity-of-foods-table.*

Baker, Lucy. "Mixed Review: How to Make Cake Balls" May 15, 2010 http://sweets.seriouseats.com/2010/05/mixed-review-how-to-make-cake-balls-frosting-chocolate-recipe.html.*

Lewicki, Piotr P. "Influence of Water Activity on Texture of Corn Flaks" Acta Agrophysica 2007, 9(1), 79-90.*

Vanilla Frosting. http://www.duncanhines.com/products/frostings/creamy-home-style-classic-vanilla-frosting/ Retrieved Oct. 27, 2014.*

Leavitt, Cathy. "Cake Concepts by Cathy" Apr. 27, 2011 http://cakeideas.blogspot.com/2011/04/cake-pops.html.*

"Chocolate Peanut Butter Frosting" May 22, 2010 https://web.archive.org/web/20100522122354/http://www.duncanhines.com/recipes/frosting-glazes/cakez559/chocolate-peanut-butter-frosting.*

Clanton, "*Shelf Life Extension*", AIB International, Oct. 2011 [retrieved on Oct. 30, 2013]. Retrived from the Internet: <URL: http://www.retailbakersofamerica.org/sites/default/files/Shelflifeextensionslides.PDF>.

CakeSpy (Jessie Oleson Moore): "Brownie Pops Recipe | Serious Eats", May 30, 2011, Retrieved from http://www.seriouseats.com/recipes/2011/05/cakespy-brownie-pops-recipe.html.

Christine Lee: "First Successful Cake Pops—Chicks!| Cake Pop Insanity!", Jun. 9, 2011, Retrieved from http://www.crickpop.com/2011/06/okay-so-few-days-after-my-first-failure.html.

OhMyGoodies: "How to Make Cake Balls!!!—CakeCentral.com", Dec. 31, 2011, Retrieved from https://www.cakecentral.com/tutorial/20204/how-to-make-cake-balls.

"Cake Pops by Duncan Hines", downloaded from http://allrecipes.com on Nov. 30, 2012.

"How to Make Cake Pop", downloaded from http://www.thekitchn.com on Nov. 30, 2012.

\* cited by examiner

SHELF-STABLE FOOD PRODUCT

FIELD OF THE INVENTION

This application is directed to confectionary food products, and methods of making the food products.

BACKGROUND

Cake is a well known dessert or snack for many people. Cakes are found in many different forms, such as sheet cakes, layered or tiered cakes (having various shapes), shaped or molded cakes, and cupcakes. A new trend has developed using freshly baked or recently baked cake to form a confectionary product. The cake is crumbled to form crumbs that are mixed with frosting, and formed into a molded product. Typically, the product is formed into a single-serving ball, often approximately 1 to 2 inches in diameter, sometimes mounted on a stick. Often, a confectionary coating, such as chocolate, is provided over the ball. This cake product is often referred to as a "cake bite", "cake ball" or "cake pop".

One of the disadvantages of these single serving confectionary food products is that they do not have a long shelf life, often molding in less than 7 days if stored at room temperature. In some instances, the short shelf life is not an issue, because the products are consumed before they spoil. However, for a retail market, longer shelf life is desired.

SUMMARY

The present invention addresses the aforementioned need by providing a shelf stable confectionary food product ("cake bite", "cake ball" or "cake pop"). The food product is a combination of crumbs (e.g., cake crumbs) combined with a shortening-based matrix and covered with a confectionary coating.

In one aspect, this disclosure provides a shelf stable, confectionary food product comprising a core formed from:
(a) dehydrated crumbs having a moisture content of less than 10%, optionally 1.5-7%, optionally 5%, and water activity from 0.2-0.6, optionally less than 0.4, optionally 0.35; and
(b) a shortening-based matrix comprising shortening and water. The core is substantially enrobed with a confectionary coating. After being combined with the shortening-based matrix, the dehydrated crumbs rehydrate. Such a food product has a shelf life at room temperature of more than 1 month, such as more than 3 months, such as more than 6 months, such as up to 9 months. In some embodiments, the dehydrated crumbs are cake crumbs. The dehydrated crumbs may be sweetened. After a preselected period of time, the crumbs combined with the shortening-based matrix, after being coated with the confectionary coating, may have a moisture content of 5-8%, optionally 6-7%, optionally 6.5%, and water activity from 0.5-0.8, optionally 0.6-0.7, optionally 0.62-0.63.

In another aspect, this disclosure provides a shelf stable, confectionary food product having a first state and a second state different than the first state, the food product having a confectionary coating over a core mixture comprising crumbs and shortening. When in the first state, the crumbs have a moisture content of 1.5-7%, optionally 5%, and water activity of 0.2-0.6, optionally 0.35. When in the second state, the crumbs and the core mixture have a moisture content of 5-8%, optionally 6.5%, and water activity of 0.5-0.8, optionally 0.63. The second state may be determined at least 24 hours after the first state, or at least 48 hours after the first state.

In yet another aspect, this disclosure provides a shelf stable, confectionary food product comprising a confectionary coating over a core mixture comprising crumbs and shortening. The food product is formed by:
(a) combining dehydrated crumbs having a water activity of less than 0.6, for example 0.2-0.6, optionally 0.3-0.4, optionally 0.35, and a shortening-based matrix comprising solid or semi-solid shortening and water to form a mixture;
(b) shaping the mixture into pieces; and
(c) coating the pieces with a confectionary coating having, for example, a water activity of 0.3-0.4, optionally 0.35. The food product has a shelf life of at least one month, optionally at least 3 months, optionally at least 6 months, and in some embodiments up to 9 months.

In yet another aspect, this disclosure provides a method of making a shelf stable food product by:
(1) combining a heated shortening-based liquid mixture with a crumb mixture having a water activity of 0.2-0.6, optionally 0.35, to form a mixture having a temperature of 80-85° F.;
(2) cooling the mixture to a temperature of 55-75° F.;
(3) forming pieces from the cooled mixture;
(4) enrobing the pieces in a confectionary material to form coated pieces;
(5) cooling the coated pieces; and
(6) packaging the cooled, coated pieces to provide the shelf stable food product.

The above summary of the various embodiments of the disclosure is not intended to describe each illustrated embodiment or every implementation of the disclosure. These and various other features and advantages will be apparent from a reading of the following detailed description.

BRIEF DESCRIPTION OF THE DRAWINGS

The invention may be more completely understood in consideration of the following detailed description of various embodiments of the invention in connection with the accompanying drawings, in which.

Figure 1:
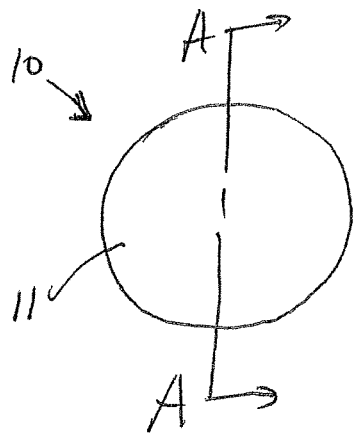
FIG. 1 is a perspective view of an embodiment of a confectionary food product of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

The present disclosure provides confectionary food products (usually single serving products) that are shelf stable for at least 1 month at room temperature after packaging, in some embodiments at least 3 months, and in other embodiments at least 6 months, and in other embodiments up to 9 months. The food product has a core formed from dehydrated crumbs (e.g., cake crumbs, brownie crumbs, cookie crumbs, muffin crumbs) combined with a shortening-based matrix and covered with a confectionary coating (e.g., chocolate). The present disclosure also provides a method of making confectionary food products that are shelf stable for at least 1 month at room temperature after packaging, in some embodiments at least 3 months or at least 6 months, and up to 9 months in some embodiments.

In achieving extended shelf life of the confectionary food products of this disclosure, the moisture level and moisture migration is managed or restricted by means of product design. Although the total moisture content of the core remains essentially constant from the time of preparation until the end of the product's shelf life, a substantial re-distribution of moisture occurs within the core after preparation. Freshly prepared products have a core having a heterogeneous distribution of moisture; with the dehydrated crumbs having very low moisture and the shortening-based matrix having intermediate moisture levels. The texture of the core at this time can be described as creamy frosting with crunchy crumbs embedded in it. It is the differential concentration of moisture within the core that drives moisture to migrate from the shortening-based matrix to the dehydrated crumbs until a thermodynamic equilibrium is achieved, usually over the period of 24-48 hours. At this point, the core is homogeneous in terms of moisture concentration and has a desirable moistness. In other words, upon equilibration, the dehydrated crumbs no longer maintain their crunchiness and the core becomes essentially uniform in texture.

In the following description, reference is made to the accompanying drawing that forms a part hereof and in which are shown by way of illustration at least one specific embodiment. The following description provides additional specific embodiments. It is to be understood that still other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

For purposes of this disclosure, water activity, or $a_w$, is measured as per AOAC 978.18, moisture content is as per AOAC 925.45, and pH is as per AOAC 943.02, where "AOAC" is the "Association of Analytical Communities."

Figure 2:
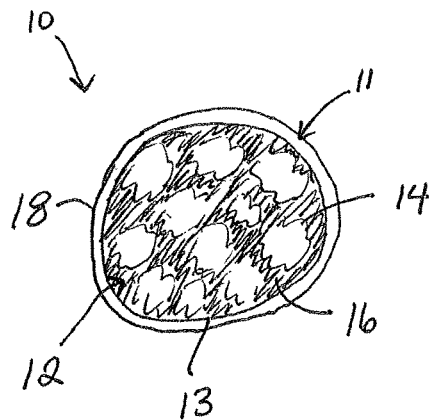
FIG. 2 is a cross-sectional view of the confectionary food product of FIG. 1 taken along line A-A.

Referring now to the figures, a food product according to the present disclosure is illustrated in FIGS. 1 and 2. Confectionary food product 10 (having an outer surface 11) has a center core 12 composed of a generally uniform mix of crumbs 14 and a shortening-based matrix 16. The combination of a mix of crumbs 14 and matrix 16 has sufficient structural integrity so as to create and maintain a shape, defined by core surface 13. Positioned over core 12 and core surface 13 is a shell 18, formed from a confectionary composition. Typically, the confectionary coating or shell 18 has a fairly even thickness. In this embodiment, both core 12 (the shape of which is defined by core surface 13) and food product 10 (the shape of which is defined by outer surface 11) are approximately spherical. Food product 10 could be another shape, such as oval (egg shaped), cylindrical, cubic, cuboidic, pyramidal, conical, or an intricate shape such as an animal, object or other design. Food product 10 is often a single serving product, but could be multiple servings. Typically, food product 10 has a size of 3 to 30 grams, typically 10 to 20 grams.

Crumbs 14 can be any previously baked crumb, such as crumbs from cake, brownies, cookies, sweet bread, or muffins. In most embodiments, crumbs 14 are at least 0.2 mm and no greater than about 10 mm. In some embodiments, crumbs 14 do not have a single size, but have a distribution of sizes. For example, 5-35% of crumbs 14 may be less than about 0.3 mm, 15-30% may be between 0.3 and 0.8 mm, 4-10% may be between 0.8 and 2.8 mm, 10-30% may be between 2.8 and 4 mm, and 10-50% may be greater than 4 mm. In some embodiments, 23-33% of crumbs 14 may be less than about 0.3 mm, 20-30% may be between 0.3 and 0.8 mm, about 10% may be between 0.8 and 2.8 mm, 18-28% may be between 2.8 and 4 mm, and 12-22% may be greater than 4 mm. Crumbs 14 are present in core 12 at a level of 15-55%, in some embodiments 25-35%.

In certain embodiments, crumbs 14 are sweetened crumbs, including an amount of sweetening agent(s) combined with or crumbs 14. Examples of suitable sweeteners include sucrose (cane or beet sugar), fructose (e.g., regular and high fructose corn syrup), dextrose, maltose, and reduced or zero calorie sweeteners such as saccharide, sucralose and stevia extracts. In some embodiments, powdered sugar (sucrose) is used. Crumbs 14 may additionally or alternately include a flavorant combined with or in the crumbs. Examples of suitable flavorant or flavoring include spices such as cinnamon and specific flavorings such as fruit, vanilla, butter, mint, chocolate and the like.

Prior to combining with shortening-based matrix 16, crumbs 14 can be referred to as dehydrated or dried crumbs. Unlike fresh cake crumbs, which have a moisture content of about 30% and a water activity ($a_w$) of about 0.8-0.9, crumbs 14 (prior to combining with shortening-based matrix 16) have a moisture content less than 10% and a water activity ($a_w$) less than 0.7, in some embodiments less than 0.5, and in some embodiments less than 0.3.

Shortening-based matrix 16 is a mixture of shortening and water. In some embodiments, matrix 16 may be an emulsion (e.g., an oil-in-water emulsion or a water-in-oil emulsion). When a solid or semi-solid shortening is used, matrix 16 is typically a 2-phase dispersion of the solid or semi-solid shortening and liquid. The ratio of shortening to water in matrix 16 is typically from 1.75:1 to 0.75:1, in some embodiments from 1.5:1 to 0.9:1 and in other embodiments from 1.3:1 to 0.95:1. Typically, at least 75 wt-% of matrix 16 is shortening/water (in some embodiments at least 80 wt-%), with the remainder being other ingredients such as flavorant(s), humectant(s), emulsifier(s), acidulant(s), or antimicrobial(s). In some embodiments, matrix 16 includes about 15% glycerin, a humectant.

Natural shortenings, animal or vegetable, or synthetic shortenings can be used in matrix 16. Generally, shortening is comprised of triglycerides, fats and fatty oils made predominantly of triesters of glycerol with fatty acids. Fats and fatty oils useful in producing shortening include cotton seed oil, ground nut oil, soybean oil, sunflower oil, grapeseed oil, sesame oil, olive oil, corn oil, canola oil, vegetable oil, safflower oil, palm oil, palm kernel oil, coconut oil, or combinations thereof.

The shortening may be composed of monounsaturated fatty acids, polyunsaturated fatty acids, and/or trans fatty acids. In some embodiments, the total saturated fatty acids in the shortening is 35-53%, with the total monounsaturated fatty acids being 15-48%, the total polyunsaturated acids being 8-35%, and the total trans fatty acids being 0.5-2%. In other embodiments, the total saturated fatty acids in the shortening is about 35%, with the total monounsaturated fatty acids being about 48%, the total polyunsaturated acids being about 16%, and the total trans fatty acids being about 1%.

In some embodiments, the shortening in matrix 16 is a solid or a semi-solid shortening, having a solid fat content (SFC) of 30-58 at 10° C., 18-34 at 20° C., 7-16 at 30° C., and 0-10 at 40° C. In some embodiments, the shortening in matrix 16 has a solid fat content (SFC) of 30-38 at 10° C., 18-24 at 20° C., 11-15 at 30° C., and 4-8 at 40° C.

As indicated above, shortening-based matrix 16 may include ingredients in addition to shortening and water, ingredients such as flavorant(s), flavoring(s), humectant(s), emulsifier(s), acidulant(s), or antimicrobial(s).

Examples of suitable flavorants or flavorings include spices and specific flavorings such as fruit, vanilla, butter, mint, chocolate and the like. The flavorant in matrix 16 can be a liquid, such as an oil.

Examples of suitable humectants include glycerin and sorbitol.

Emulsifiers include nonionic, anionic, and/or cationic surfactants that can be used to influence the texture and homogeneity of a mixture, increase stability, improve eating quality, and prolong palatability. Emulsifiers include compounds such lecithin, mono- and diglycerides of fatty acids, propylene glycol mono- and diesters of fatty acids, glyceryl-lacto esters of fatty acids, ethoxylated mono- and diglycerides and the like.

Examples of suitable acidulants are glucono delta-lactone, citric acid, ascorbic acid, and malic acid.

Examples of suitable antimicrobials or other preservatives or mold inhibitors include sodium salts of propionic or sorbic acids, potassium sorbate, sodium diacetate, vinegar, monocalcium phosphate, lactic acid, sodium benzoate, and mixtures thereof.

The ratio of crumbs 14 to shortening-based matrix 16 (i.e., in core 12) is typically from 1.5:1 to 0.75:1, in some embodiments from 1.25:1 to 0.9:1 and in other embodiments about 1:1.

Core 12 may have a total fat level of 14-18%, with the total saturated fatty acids being 7-11%, the total monounsaturated fatty acids being 2-6%, the total polyunsaturated acids being 1-4%, and the total trans fatty acids being less than 0.1%, (e.g., 0.05-0.1%). In other embodiments, the total fat level is 16-17%, the total saturated fatty acids 7-9%, the total monounsaturated fatty acids is 5-6%, the total polyunsaturated acids is 2-3%, and the total trans fatty acids is 0.07-0.1%.

Confectionary coating or shell 18 inhibits moisture migration out from core 12 and preferably completely enrobes core 12, providing a low-permeability coating around core 12. Typically, shell 18 is no thicker than 5 mm, and usually no thicker than 2 mm. Shell 18 usually is no more than 50% of the weight of product 10, typically no more than 30%.

Examples of confectionary ingredients for shell 18 include chocolate (e.g., milk chocolate, dark chocolate, white chocolate), almond bark, and confectionary coating or candy melts. The composition of shell 18 is selected to inhibit its softening or melting in the presence of moisture and/or heat.

Table 1 provides an exemplary list of ingredients as well as exemplary formulation ranges for the ingredients in product 10.

TABLE 1

| Ingredient | Possible Range(s) (wt-%) in Product |
|---|---|
| Confectionary coating | 15-50 |
|  | 25-35 |
| Sweetener(s) | 10-35 |
|  | 20-25 |
|  | 21-24 |
| Dehydrated crumbs | 10-55 |
|  | 17-22 |
| Shortening | 3-20 |
|  | 8-11 |
| Water | 2-15 |
|  | 5-7 |
| Fructose | 2-15 |
|  | 3-5 |
| Glycerin | 2-8 |
|  | 3-5 |
| Glucono delta lactone | 0-3 |
|  | 0.2-2 |
|  | 0.5-0.7 |
| Flavoring(s) | 0-2 |
|  | 0.2-0.6 |
| Salt | 0-2 |
|  | 0.05-1 |
|  | 0.1-0.3 |
| Potassium sorbate | 0-2 |
|  | 0.01-1.5 |
|  | 0.1-0.2 |
| Distilled mono-glyceride(s) | 0-6 |
|  | 0.1-5 |
|  | 0.1-0.2 |
| Polysorbate | 0-6 |
|  | 0.1-5 |
|  | 0.1-0.2 |
| Colorant | 0-2 |
|  | 0.02-0.06 |

Figure 3:
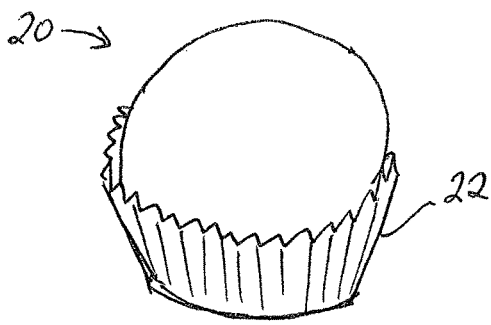
FIG. 3 is a perspective view of an embodiment of the confectionary food product of the disclosure.
Figure 4:
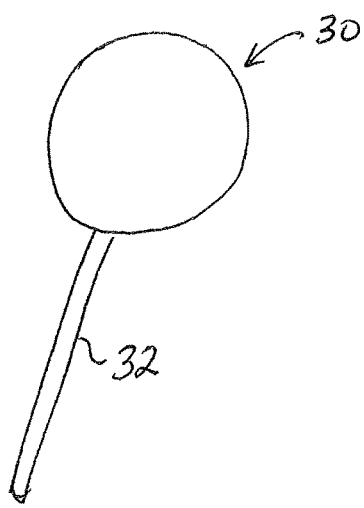
FIG. 4 is a perspective view of an embodiment of the confectionary food product of the disclosure.

FIGS. 3 and 4 illustrate two ready-to-eat confectionary food products, both similar to the food product of FIGS. 1 and 2. In FIG. 3, a confectionary food product 20 according to the present disclosure and as described above is seated in a wrapper 22. In FIG. 4, a confectionary food product 30 according to the present disclosure and as described above is mounted on a stick 32. In both of these configurations, food products 20, 30 are ready to be consumed. It is assumed that in this state, products 20, 30 are on a shelf or otherwise displayed in a retail locale, which is often at least one month after packaging of products 20, 30.

Figure 5:
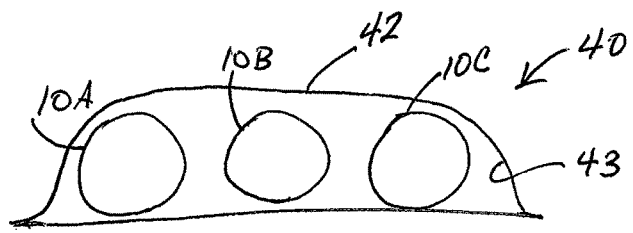
FIG. 5 is a schematic side view of an embodiment of a packaged confectionary food product of the disclosure.

FIG. 5 illustrates an embodiment of packaged confectionary food products. Retail product 40 has a packaging or overwrap 42 with an internal volume 43 for receiving product. In this embodiment, three confectionary food products 10A, 10B, 10C according to the disclosure are provided in overwrap 42. Packaging or overwrap 42 may be any conventional packaging and include materials such as paper, polymeric material (including metallized polymeric material), metal foil, paperboard, cardboard, and the like. The packaging may be flexible (as is polymeric film) and/or rigid (as is a paperboard container). In some embodiments, the packaging is a metallized flexible laminate package.

In the packaged retail state, products 10, 20, 30 have a moisture content of 5-8%, in some embodiments 6-7% (e.g., 6.5%), a water activity ($a_w$) from 0.5-0.8, in some embodiments 0.6-0.65 (e.g., 0.63), and a pH of 3-7.

Food products 10, 20, 30 have been described when in a ready-to-be-sold or ready-to-be-consumed state. The food products are a complex, dynamic hydrated system; the food products have a first set of properties at the time of forming food products 10, 20, 30 and a different, second set of properties at a second time, about 48 hours after the time of forming the product, in some embodiments as soon as about 24 hours. The overall moisture within food products 10, 20, 30 does not significantly change, but the distribution of it within the product does. Immediately upon forming food product 10, core 12 has a creamy texture with crunchy bits (dehydrated crumbs) distributed throughout. After approximately 24-48 hours, the moisture has at least begun to equilibrate among the ingredients, migrating from shortening-based matrix 16 to crumbs 14, thus hydrating or rehydrating the initially dry crumbs. Thus, when eaten, food product has a uniformly moist core 12.

The food products 10, 20, 30, in their ready-to-consume state, have a moist core 12 with a soft yet non-sticky shell 18, both which have highly desirable organoleptic properties. These desirable properties remain at least 1 month, usually at least 3 months, sometimes at least 6 months after packaging, and sometimes up to 9 months after packaging. Additionally, products 10, 20, 30 avoid mold growth thereon and therein for at least one month, usually at least 3 months, sometimes at least 6 months, and sometimes up to 9 months.

Moisture Management

As described above, the shelf life of the confectionary food products 10, 20, 30 of this disclosure is based on the management of moisture level and moisture migration within the product. Although the total moisture content of core 12 remains essentially constant from the time of preparation until the end of the product's shelf life, a substantial equilibration of moisture occurs within the core after preparation. Freshly prepared products have a core formed from dehydrated crumbs having very low moisture (e.g., less than 0.7 water activity ($a_w$) and less than 7% moisture) and the shortening-based matrix having intermediate moisture levels (e.g., less than 0.7 or 0.65 water activity ($a_w$)). It has been found that these moisture levels of the initial ingredients are necessary in order to obtain products 10, 20, 30 with acceptable shelf life. For example, a confectionary product made from frozen baked cake crumbs (having 0.9 $a_w$) and a low moisture shortening-based matrix (having 0.3 $a_w$), although the result may be a final, equilibrated product with about 0.7 $a_w$ for the product, this product would be unacceptable, as such products typically result in the growth of mold on the exterior of the confectionary coating and softening of the confectionary coating. Another example, a confectionary product made from low moisture cake crumbs (having 0.8 $a_w$) and a low moisture shortening-based matrix (having 0.4 $a_w$), although the result may be a final, equilibrated product with about 0.7 $a_w$ for the product, this product would also be unacceptable, as such products typically result in the growth of mold on the exterior of the confectionary coating, softening of the confectionary coating, and off flavors throughout the product.

The following tables provide additional exemplary acceptable and unacceptable combinations.

Exemplary Acceptable Confectionary Product 1

| | cake crumbs | shortening-based matrix | core (crumbs + matrix) | coating |
|---|---|---|---|---|
| Initial $a_w$ | 0.285 | 0.65 | 0.625 | 0.3 |
| 1 week $a_w$ | unknown | unknown | 0.621 | 0.568 |

Exemplary Acceptable Confectionary Product 2

| | cake crumbs | shortening-based matrix | core (crumbs + matrix) | coating |
|---|---|---|---|---|
| Initial $a_w$ | 0.285 | unknown | 0.654 | 0.3 |
| 1 week $a_w$ | unknown | unknown | 0.631 | 0.561 |

Exemplary Unacceptable Confectionary Product—due to mold growth after 1 month

| | cake crumbs | shortening-based matrix | core (crumbs + matrix) | coating |
|---|---|---|---|---|
| Initial $a_w$ | 0.83 | 0.32 | 0.72 | 0.3 |
| 1 week $a_w$ | unknown | unknown | 0.71 | 0.63 |

Method of Making the Confectionary Food Products

Figure 6:
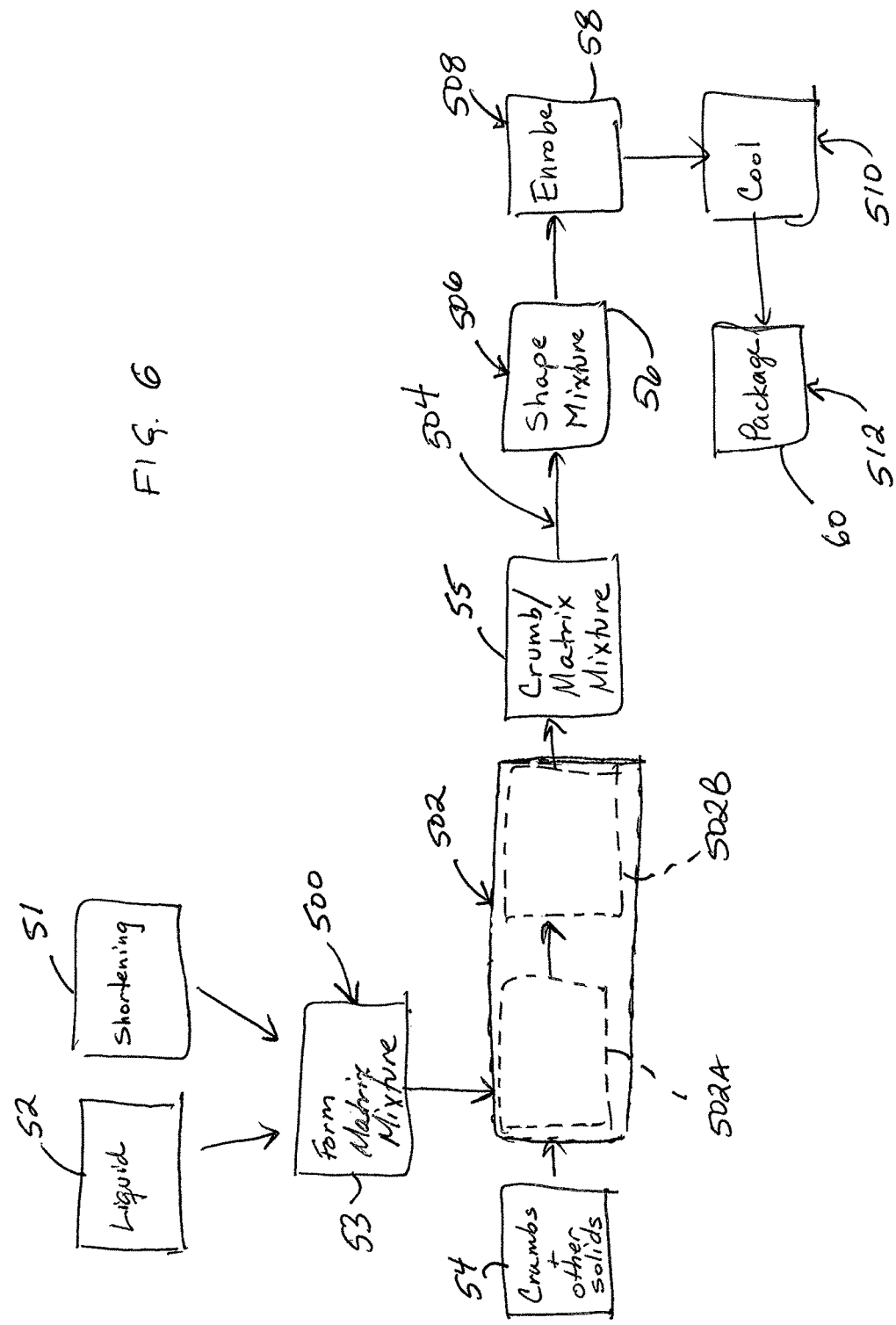
FIG. 6 is a process schematic depicting a method for forming the confectionary food product of FIG. 1.

As described above in respect to FIGS. 1 and 2, confectionary food product 10 has a center core 12 composed of crumbs 14 and shortening-based matrix 16 covered by confectionary coating or shell 18. FIG. 6 illustrates one embodiment of a process for forming food product 10.

In a preliminary step, shortening-based matrix 16 is formed in a high shear mixing step 500 by combining a shortening ingredient 51 with a liquid ingredient 52.

Shortening ingredient 51 includes shortening (for example, solid or semi-solid shortening) and optionally an emulsifier(s) such as monoglycerides and polysorbate 60. Shortening ingredient 51 is heated to a temperature above 150° F. (e.g., above 160° F., e.g., 165° F.) to melt the shortening and dissolve or melt any other ingredients. This may be done, for example, in a jacketed kettle at 165° F.

Liquid ingredient 52 includes water and optionally humectant(s) such as glycerol, emulsifier(s) such as monoglyceride and polysorbate 60, and acidulent(s) such as glucono delta lactone. Liquid ingredient 52 is heated to a temperature above 150° F. (e.g., above 160° F., e.g., 165° F.) to dissolve or melt any ingredients in the water. This may be done, for example, in a jacketed kettle at 165° F.

Shortening ingredient 51 and liquid ingredient 52 are combined at step 500 to form a homogenous mixture 53; in some embodiments, the mixture is an emulsion or a dispersion, or in other embodiments, the mixture is a solution (with no precipitate). Step 500 may be done utilizing a high shear mixer (e.g., Lightnin' mixer, Breddo Likwifier, or Rotosolver) for 5-120 minutes at 165° F. In some embodiments, the resulting matrix mixture 53 is used within 6 hours of being made, often within 4 hours.

After mixing step 500, matrix mixture 53 is added to the dry crumb ingredients 54. Crumb ingredients 54 is a generally uniform mix of cake crumbs and optional solid ingredients such as sweetener(s), salt, other flavors and other ingredients. At this stage, the cake crumbs can be referred to as 'dehydrated' or 'dried' crumbs, having a moisture content of 1.5-7%, in some embodiments 4-6% (e.g., 5%), and a water activity ($a_w$) less than 0.7, in some embodiments 0.2-0.6 (e.g., 0.35). Crumb ingredients 54 may be combined until incorporated, for example, in a sigma mixer or commercial stand mixer.

The dry crumb ingredients 54 are combined with matrix mixture 53 from step 500 at step 502; this may be done as one stage or two stages 502A and 502B, depending on the processing equipment (e.g., mixer) used. At this point, matrix mixture 53 has cooled, such as to a temperature of 70-150° F. (e.g., at or near 90° F.). In this stage, the crumb ingredients 54 are wetted with matrix mixture 53. This may be done, for example, in a Sigma mixer or a commercial stand mixer until the desired density is achieved. To facilitate the process and decrease material handling, matrix mixture 53 may be added to crumb ingredients 54 in the same mixer in which crumb ingredients 54 were prepared.

The resulting crumb/shortening mixture 55 preferably has a density of 0.78 g/cc to 1.31 g/cc, in some embodiments 0.84 g/cc to 1.06 g/cc.

The resulting crumb/shortening mixture 55 from step 502, which may be at a temperature of 80-85° F. after step 502, is cooled at step 504 prior to shaping. The cooling may be done, for example, at 40-60° F. for 1-8 hours, to provide a chilled mixture 55 at a temperature of 55-75° F. At this stage, the chilled mixture 55 has a water activity ($a_w$) of 0.5-0.8 (e.g., 0.65). The pH of mixture 55 is 3-7.

The chilled crumb/shortening mixture 55 is shaped and sized as desired at step 506. For example, mixture 55 may be extruded and wire cut to form individual pieces, e.g., cylinder-shaped 10 gram pieces. Alternately, mixture 55 may be sheeted or slabbed, molded, and optionally subsequently sliced, cut or press cut. Mixture 55 may alternately or additionally be sized/shaped by other techniques. The resulting shaped and sized piece 56 can be 3-30 grams, typically 10-20 grams. Optionally, piece 56 may be chilled prior to the subsequent step.

Piece 56 is coated (e.g., enrobed) with a confectionary coating at step 508. The coating at step 508 may be done, for example, by dunking or immersing, curtain coating, or otherwise covering piece 56 to form coated piece 58. In some embodiments, step 508 may include two stages, coating different portions of piece 56 (e.g., coating the bottom of piece 56 separately from the top and sides of piece 56). In some embodiments, multiple coating steps 508 may be done to provide a multiple layered coating. Depending on the confectionary material and/or its temperature, coated piece 58 may be cooled at step 510. Step 510 may be merely cooling piece 58 at ambient temperature or chilling, for example, at a temperature from 35-55° F.

After sufficient cooling, coated piece 58 is packaged at step 512 to provide a saleable food product 60. Typically, packaging step 512 is done within 30 to 60 minutes of coating step 508. Step 512 includes adding optional element(s) such as wrapper 22 (FIG. 3) and stick 32 (FIG. 4) and an overwrap (e.g., a plastic overwrap) such as overwrap or packaging 42 (FIG. 5). In most embodiments, step 512 fully surrounds coated piece 58 of food product 60 with a packaging overwrap material, although elements such as stick 32 may not be wrapped or otherwise covered by the packaging.

The resulting food product 60, immediately after packaging step 512, has a moisture content from 5-8%, in some embodiments 6-7% (e.g., 6.5%), and a water activity ($a_w$) from 0.5-0.8, in some embodiments 0.6-0.7 (e.g., 0.63). At this stage, food product 60, if it were to be eaten, has a creamy texture with crunchy bits (dehydrated crumbs) distributed throughout.

After approximately 24-48 hours, the moisture in food product 60 has at least begun to equilibrate among the ingredients. Within this sufficient time period, moisture has migrated from shortening mixture 53 to crumb mixture 55 to cause food product 60, when eaten, to have a core with a moist uniform texture surrounded by a moist shell, regardless of product age during its 1-9 month shelf life.

Exemplary Confectionary Food Products

In one particular example, a food product 10 was formed from the ingredients listed in Tables 2-4 using the process of FIG. 6, described above.

TABLE 2

Liquid Ingredients 52

| Ingredient | Wt-% |
|---|---|
| Polysorbate 60 | 1.17 |
| Water | 56.74 |
| Glycerin | 30.58 |
| Potassium sorbate | 1.55 |
| Yellow #35 | 0.34 |
| Glucono delta lactone | 5.50 |
| Butter vanilla flavor | 4.12 |

TABLE 3

Shortening Ingredients 51

| Ingredient | Wt-% |
|---|---|
| Shortening - palm/canola | 98.61 |
| Distilled mono glycerides | 1.39 |

50.937 parts of Liquid Ingredients from Table 2 were combined with 49.063 parts of Shortening Ingredients from Table 3 to form a 2-part dispersion (matrix mixture 53 from FIG. 6).

TABLE 4

Crumb/shortening mixture 55

| Ingredient | Wt-% |
|---|---|
| Powdered sugar | 33.334 |
| Yellow cake crumbs, coarse | 29.972 |
| Fructose | 6.780 |
| Salt, regular | 0.250 |
| First addition matrix mixture 53 | 20.000 |
| Second addition matrix mixture 53 | 9.664 |

The final food product, after shaping and coating, was 70 wt-% crumb/shortening mixture 55 and 30 wt-% chocolate flavored coating.

Shelf-Life Testing

Food product samples, prepared as above, were stored for 16 weeks under the following conditions to simulate warehouse distribution and to test accelerated shelf life.

(1) 90° F. with 15% RH—to simulate hot dry stress (2) weather room conditions (cycling through a temperature of 90° F. for 12 hours followed by 70° F. for 12 hours, 65% RH)—to simulate hot humid stress (3) ambient storage (70° F. with 38% RH)—to simulate room temperature storage The food product samples were pulled from the 'hot dry' and 'hot humid' storage conditions every two weeks to evaluate organoleptic properties including: texture, flavor, and overall acceptability. The ambient samples were pulled at 12, 16, 24 and 36 weeks to evaluate organoleptic properties including: texture, flavor, and overall acceptability. All evaluations were performed after allowing the samples to allowing the samples to equilibrate at room temperature for at least 24 hours.

A five point evaluation scale was used to grade samples. Score of 4 or above was deemed as shelf life failure.

1=Like fresh product

2=Like fresh until compared to 0° F. sensory reference. There maybe a flavor loss or slight change in texture 3=Product is not "like fresh" but has no clearly objectionable characteristics. The difference should be apparent even without going back to the sensory reference.

4=There are some off notes detected or the texture is marginal.

5=Product is objectionable and should clearly not be available to the consumer.

Under the storage conditions of 90° F. with 15% relative humidity (i.e., 'hot dry'), samples maintained a favorable score of less than 4 for at least 12 weeks. Kinetic modeling, based on flavor loss and texture degradation, predicted an equivalent shelf life of 8-9 months under ambient storage conditions.

Similarly, under weather room conditions (i.e., 'hot humid'), samples maintained a favorable score of less than 4 for at least 12 weeks, which was predicted to be equivalent to 8-9 months at ambient storage conditions per kinetic storage models.

These findings were confirmed with samples stored at ambient conditions (70° F. with 38% relative humidity). All samples maintained a score of less than 3 for at least 24 weeks. No objectionable flavor or texture degradation was observed in the samples during this storage period.

Although various embodiments of the present disclosure have been disclosed here for purposes of illustration, it should be understood that a variety of changes, modifications and substitutions may be incorporated without departing from either the spirit or scope of the present disclosure.

The invention claimed is:

1. A method for forming a food product comprising:
    combining shortening with water to form a shortening mixture, wherein the water and shortening make up at least 75% of the shortening mixture and combining the shortening and water includes: 1) heating solid or semi-solid shortening to a temperature of at least 150° F. prior to combining the shortening with the water; or 2) heating the shortening mixture after combining the shortening with the water;
    combining dehydrated crumbs having a moisture content less than 10% and a water activity of 0.2 to 0.6 with the shortening mixture at a ratio of the dehydrated crumbs to the shortening mixture of 1.5:1 to 0.75:1 to form a crumb mixture;
    forming the crumb mixture into a plurality of cores, each of the plurality of cores being capable of maintaining a shape; and
    coating each of the plurality of cores with a confectionary coating to form a respective shell over each of the plurality of cores, wherein, after coating, the crumb mixture of each of the plurality of coated cores has a water activity of 0.5 to 0.8.

2. The method of claim 1, wherein the dehydrated crumbs are cake crumbs, cookie crumbs, brownie crumbs or muffin crumbs.

3. The method of claim 2, wherein, prior to coating, each of the plurality of cores has a mass of 10 to 20 grams.

4. The method of claim 1, wherein, after coating, the crumb mixture of each of the plurality of coated cores has a water activity of 0.6 to 0.7.

5. The method of claim 4, wherein, prior to combining the dehydrated crumbs with the shortening mixture, the dehydrated crumbs have a water activity of 0.3 to 0.4.

6. The method of claim 1, wherein, 24 or more hours after coating, the dehydrated crumbs have a water activity of 0.5 to 0.8.

7. The method of claim 6, wherein, 24 or more hours after coating, the dehydrated crumbs have a water activity of 0.6 to 0.7.

8. The method of claim 1, wherein the respective shell of each of the plurality of coated cores is less than or equal to 5 millimeters thick.

9. The method of claim 1, wherein the respective shell of each of the plurality of coated cores is less than or equal to 50% of the coated core by weight.

10. The method of claim 1, further comprising: packaging the plurality of coated cores, wherein, after packaging, the crumb mixture of each of the plurality of coated cores has a water activity of 0.5 to 0.8.

11. The method of claim 1, wherein the crumb mixture, prior to forming into the plurality of cores, has a density of 0.78 to 1.31 g/cc.

* * * * *